United States Patent
Yamamoto

(10) Patent No.: US 9,327,759 B2
(45) Date of Patent: May 3, 2016

(54) CONTROL UNIT AND ELECTRIC POWER STEERING APPARATUS HAVING THE CONTROL UNIT

(71) Applicant: DENSO CORPORATION, Kariya, Aichi-pref. (JP)

(72) Inventor: Toshihisa Yamamoto, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/632,541

(22) Filed: Feb. 26, 2015

(65) Prior Publication Data

US 2015/0251690 A1 Sep. 10, 2015

(30) Foreign Application Priority Data

Mar. 7, 2014 (JP) .................................. 2014-44652

(51) Int. Cl.
*H02H 7/08* (2006.01)
*B62D 5/04* (2006.01)
*H02P 6/00* (2016.01)
*H02P 6/24* (2006.01)

(52) U.S. Cl.
CPC .............. *B62D 5/046* (2013.01); *B62D 5/0484* (2013.01); *B62D 5/0487* (2013.01); *H02P 6/002* (2013.01); *H02P 6/24* (2013.01)

(58) Field of Classification Search
CPC ...... B62D 5/046; B62D 5/0484; H02P 27/06; H02P 29/021; H02P 2201/09; H02P 25/18; H02P 6/12
USPC ................ 318/400.21, 400.26, 722, 724, 434
See application file for complete search history.

(56) References Cited

U.S. PATENT DOCUMENTS 8,350,510 B2 * 1/2013 Ogasawara ........... H02M 3/158
180/443
8,659,253 B2 * 2/2014 Satou ................... B62D 5/0484
318/139

(Continued)

FOREIGN PATENT DOCUMENTS

JP 2008-72880 3/2008
JP 2009-83535 4/2009

(Continued)

OTHER PUBLICATIONS

Office Action (2 pages) dated Feb. 18, 2016, issued in corresponding Japanese Application No. 2014-044652 and English translation (2 pages).

*Primary Examiner* — Bentsu Ro
*Assistant Examiner* — Thai Dinh
(74) *Attorney, Agent, or Firm* — Nixon & Vanderhye P.C.

(57) ABSTRACT

In a control unit, a control part is operated by electric power from an ignition power supply, and controls operations of relays and inverters. A first end of a boosting part is electrically connected between at least one relay and a corresponding inverter. A second end of the boosting part is electrically connected to the control part. The boosting part boosts a voltage at the first end, and outputs the voltage boosted from the second end. An abnormality detecting portion detects an abnormality of the boosting part. When the abnormality detecting portion detects an abnormality of the boosting part, the control part controls the at least one relay to which the first end of the boosting part is connected to shut off a flow of electric power from a main power supply to the boosting part and to the inverter corresponding to the at least one relay.

4 Claims, 6 Drawing Sheets

(56) References Cited

U.S. PATENT DOCUMENTS

| | | | | |
|---|---|---|---|---|
| 8,664,904 B2* | 3/2014 | Suzuki | ............... | B62D 5/046 318/400.3 |
| 8,698,435 B2* | 4/2014 | Tada | ............... | H02H 7/0844 318/400.21 |
| 2006/0055351 A1* | 3/2006 | Suzuki | ............... | B62D 5/046 318/432 |
| 2008/0217095 A1 | 9/2008 | Ono | | |
| 2009/0058326 A1* | 3/2009 | Oyobe | ............... | B60K 6/445 318/53 |
| 2011/0156629 A1 | 6/2011 | Satou et al. | | |
| 2013/0179039 A1 | 7/2013 | Uryu | | |

FOREIGN PATENT DOCUMENTS

| JP | 5257389 | 5/2013 |
|---|---|---|
| JP | 2013-159165 | 8/2013 |

* cited by examiner

CONTROL UNIT AND ELECTRIC POWER STEERING APPARATUS HAVING THE CONTROL UNIT

CROSS REFERENCE TO RELATED APPLICATION

This application is based on Japanese Patent Application No. 2014-44652 filed on Mar. 7, 2014, the disclosure of which is incorporated herein by reference.

TECHNICAL FIELD

The present disclosure relates to a control unit that controls a rotary electric machine, and an electric power steering apparatus having the control unit.

BACKGROUND

It has been known a vehicle equipped with a control unit for controlling a rotary electric machine of an electric power steering apparatus, and a DC-DC converter that boosts a voltage of an electric power supplied from a battery and outputs the voltage boosted to the control unit. In a vehicle described in JP 5257389 B2 (hereinafter referred to as the patent literature 1), when a voltage of a battery is lowered due to the start of a starter to restart an engine after an idle reduction state of an automatic stop and start system, the voltage is boosted by the DC-DC converter and is outputted to the control unit. This restricts the control unit from being restarted or stopped due to the voltage of electric power supplied when the engine is restarted being lower than an operation guarantee voltage.

In the patent literature 1, when the DC-DC converter has an abnormality, it is difficult to output a voltage equal to or higher than the operation guarantee voltage when the engine is restarted. In such a case, the electric power steering apparatus will not function.

In the patent literature 1, the DC-DC converter is configured to boost the voltage supplied from the battery, and to output the voltage boosted to a control unit for an anti-block braking system and a navigation system, in addition to the control unit of the electric power steering apparatus. Therefore, the size of the DC-DC converter is large, and the DC-DC converter is accommodated in a housing that is separate from a housing of the control unit for the electric power steering apparatus. As such, it will be difficult to install the DC-DC converter to an installation space of a vehicle, which is usually limited. Further, in a case where plural housings are separately arranged, the manufacturing costs will increase.

SUMMARY

It is an object of the present disclosure to provide a small control unit, which is capable of controlling a rotary electric machine even when a supply voltage to a control part is dropped or even when a boosting part has an abnormality, and to provide an electric power steering apparatus having the control unit.

According to an aspect of the present disclosure, a control unit is for a rotary electric machine that includes a plurality of winding units, each of which has a plurality of wirings correspondingly provided for a plurality of phases or terminals. The control unit includes a plurality of power converting parts, a plurality of relays, a control part, a boosting part, and an abnormality detecting portion. The power converting parts are correspondingly provided for the winding units. Each of the power converting parts converts an electric power from a first power supply and supplies the electric power converted to the rotary electric machine to rotate the rotary electric machine. Each of the relays is disposed between the first power supply and a corresponding one of the power converting parts, and permits or shuts off a flow of the electric power between the first power supply and the corresponding one of the power converting parts. The control part is operated by an electric power from a second power supply. The control part controls operations of the relays and the power converting parts to control the rotary electric machine. The boosting part has a first end and a second end. The first end is electrically connected between at least one relay, excluding one, among the plurality of relays, and the power converting part corresponding to the at least one relay. The second end is electrically connected to the control part. The boosting part boosts a voltage at the first end and outputs the voltage boosted from the second end. The abnormality detecting portion detects an abnormality of the boosting part. When the abnormality detecting portion detects the abnormality of the boosting part, the control part controls the at least one relay, to which the first end of the boosting part is connected, to shut off a flow of the electric power from the first power supply to the boosting part and to the power converting part corresponding to the at least one relay to which the first end of the boosting part is connected.

In the above structure, even if the voltage of the second power supply, which supplies the electric power to the control part, is dropped, the voltage of the first power supply can be boosted to a voltage level higher than an operation guarantee voltage, and provided to the control part. Therefore, a situation where the control part is restarted or stopped due to the voltage drop of the second power supply can be reduced, and hence the control of the rotary electric machine by the control part can be continued. The abnormality detecting portion can detect an abnormality of the boosting part.

When the abnormality detecting portion detects the abnormality of the boosting part, the control part controls the relay to which the first end of the boosting part is connected to shut off the flow of the electric power from the first power supply to the boosting part and the power converting part, which corresponds to the at least one relay to which the first end of the boosting part is connected. Therefore, since the electric power supply to the boosting part is shut off, the boosting part having the abnormality can be separated from the control unit. In this case, it is not necessary to add a power shutting device, such as a relay, to shut off the electric power supply to the boosting part having the abnormality. Therefore, the power converting parts, the relays, the control part can be accommodated in one housing. Accordingly, the control unit including the boosting part has a simple structure, and is reduced in size.

Although the electric power supply to the at least one relay to which the first end of the boosting part is connected is shut off in accordance with the shutting off of the electric power to the boosting part, the electric power can be supplied to the power converting part that corresponds to "the one relay excluded among the plurality of relays", that is, the relay to which the first end of the boosting part is not connected. Therefore, the control and drive of the rotary electric machine can be continued, while separating the boosting part having the abnormality.

For example, the rotary electric machine may be used as a driver of an electric power steering apparatus. In such a case, even if an abnormality occurs, the control unit needs to continue the control of the rotary electric machine as much as possible. In the control unit described above, even when the voltage of the second power supply is dropped, the boosting part boosts the voltage and provides the voltage boosted to the control part. Further, even if the boosting part has an abnormality, the control of the rotary electric machine can be continued, while separating the boosting part from the control unit. Therefore, even if the voltage of the second power supply is dropped, or even if an abnormality occurs in the boosting part, a steering operation by an operator can be assisted, without stopping the power steering apparatus. Since the control unit is reduced in size, the control unit can be installed in a space of a vehicle to which the electric power steering apparatus is installed. Further, manufacturing costs reduce, as compared with a case where the boosting part and the control part are arranged in separate housings.

BRIEF DESCRIPTION OF THE DRAWINGS

The above and other objects, features and advantages of the present disclosure will become more apparent from the following detailed description made with reference to the accompanying drawings, in which like parts are designated by like reference numbers and in which.

DETAILED DESCRIPTION

Hereinafter, embodiments of the present disclosure will be described with reference to the drawings. In the embodiments, like parts will be designated with like reference numbers, and descriptions thereof will not be repeated.

First Embodiment

Figure 1:
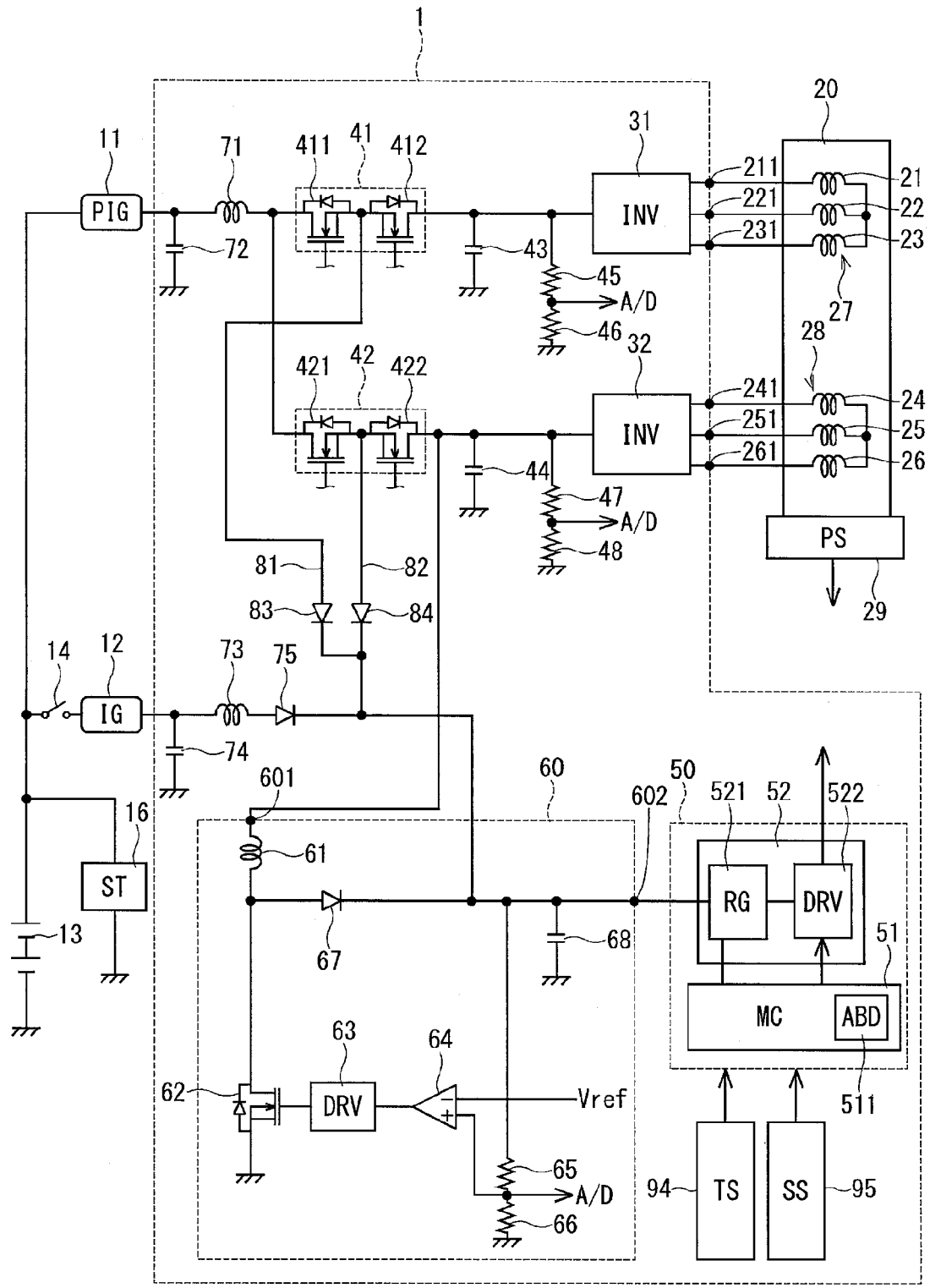
FIG. 1 is a block diagram of a control unit according to a first embodiment of the present disclosure.

Referring to FIG. 1, an EPS-ECU 1, which is a control unit according to a first embodiment, drives and controls a motor (M) 20 as a rotary electric machine. The EPS-ECU 1 is, for example, employed to an electric power steering (EPS) apparatus of a vehicle for assisting a steering operation, together with the motor 20. In such a case, the EPS-ECU 1 is an electronic control unit for the electric power steering apparatus.

Figure 2:
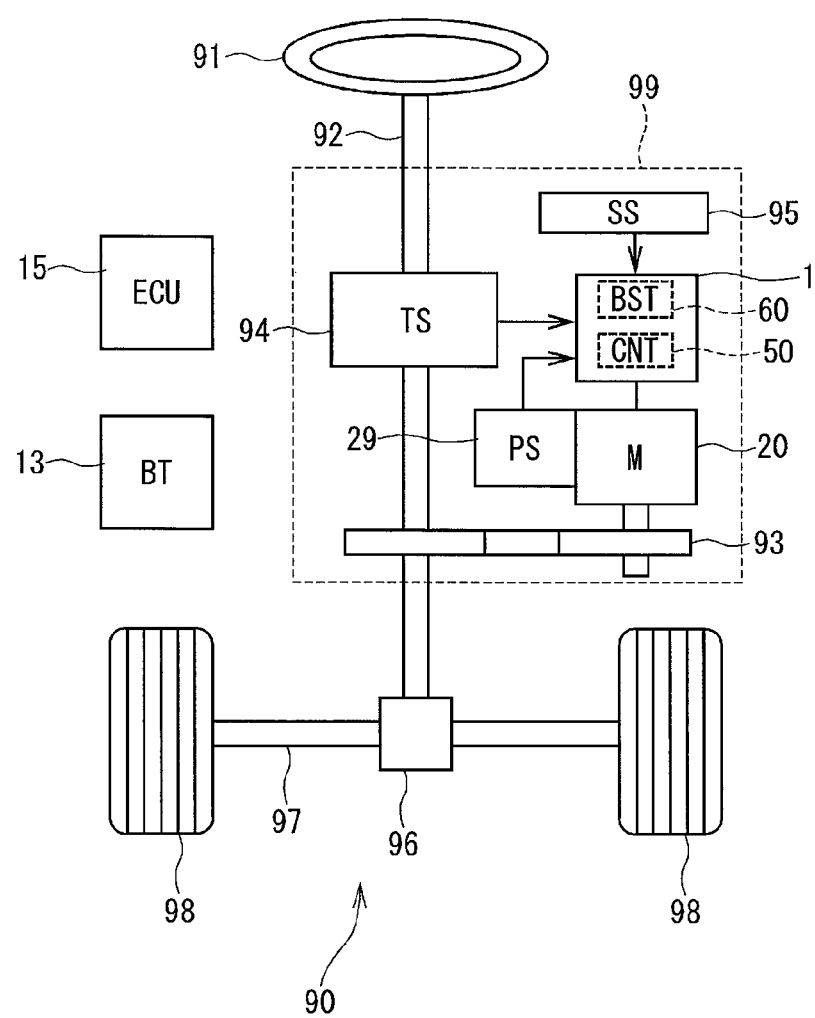
FIG. 2 is a schematic block diagram of an electric power steering apparatus to which the control unit according to the first embodiment is employed.

FIG. 2 is a diagram schematically illustrating an overall structure of a steering system 90 including an electric power steering apparatus 99. The electric power steering apparatus 99 includes a torque sensor (TS) 94. The torque sensor 94 is attached to a steering shaft 92 that is connected to a steering wheel 91. The torque sensor 94 senses a steering torque inputted to the steering shaft 92 from the steering wheel 91 by an operator, such as a driver of a vehicle.

A pinion gear 96 is provided at an end of the steering shaft 92. The pinion gear 96 is engaged with a rack shaft 97. Wheels 98 are connected to opposite ends of the rack shaft 97 through tie rods to be rotatable.

When the driver rotates the steering wheel 91, the steering shaft 92 rotates. The rotation of the steering shaft 92 is transformed into a linear motion of the rack shaft 97 through the pinion gear 96, and hence the wheels 98 are steered to an angle according to the displacement of the linear motion of the rack shaft 97.

The electric power steering apparatus 99 includes the EPS-ECU 1, the motor 20, a speed reduction gear 93, and the like. The EPS-ECU 1 drives and controls the motor 20. The motor 20 generates a steering assist torque. The motor 20 rotates the speed reduction gear 93 in forward and reverse directions. The speed reduction gear 93 reduces the speed of the rotation outputted from the motor 20, and transmits the rotation to the steering shaft 92. The electric power steering apparatus 99 further includes the torque sensor 94 and a vehicle speed sensor (SS) 95 that senses the speed of a vehicle.

In such a configuration, the power steering apparatus 99 generates the steering assist torque for assisting the steering operation of the steering wheel 91 from the motor 20, and transmits the steering assist torque to the steering shaft 92. In the present embodiment, the electric power steering apparatus 99 is a column-assist type electric power steering apparatus.

The motor 20 is a three-phase brushless motor. Although not illustrated, the motor 20 includes a rotor and a stator. The rotor is a disc-shaped member on a surface of which permanent magnets are attached to provide magnetic poles. The stator accommodates the rotor therein, and rotatably supports the rotor. The stator has protrusions protruding radially inward directions at a predetermined angular interval. Windings 21 to 26 shown in FIG. 1 are wound around the protrusions.

The windings 21, 22, and 23, respectively, correspond to a U phase, a V phase and a W phase. The windings 21 to 23 form a winding unit (WD) 27. The windings 24, 25, and 26, respectively, correspond to the U phase, the V phase and the W phase. The windings 24 to 26 form a winding unit (WD) 28. The winding units 27 and 28 correspond to a plurality of winding units. The motor 20 is provided with a position sensor (PS) 29 that senses a rotational position of the motor 20 (rotor). The motor 20 is rotated by an electric power supplied from a main power supply (PIG) 11 as a first power supply. The main power supply 11 is electrically connected to a high potential side (positive side) of a battery (BT) 13 mounted in the vehicle. The main power supply 11 is supplied with an electric power having a predetermined voltage from the battery 13

As shown in FIG. 1, the EPS-ECU 1 includes inverters 31 and 32 as power converting parts, relays 41 and 42, a control part (CNT) 50, a boosting part 60 (BST), power supply lines 81 and 82, and the like.

The inverter 31 is a three-phase inverter. The inverter 31 has six switching elements that are bridge-connected to each other to switch an electric current supply to the respective windings 21 to 23 of the winding unit 27. The switching elements of the inverter 31 are, for example, metal oxide semiconductor field effect transistors (MOS-FETs), which are a kind of field effect transistors.

In the inverter 31, the six switching elements are paired. Namely, the inverter 31 has three pairs of switching elements. Each pair of the switching elements is made of a high potential-side switching element and a low potential-side switching element. A connecting point between the high potential-side switching element and the low potential-side switching element is electrically connected to a corresponding one of the windings 21, 22, and 23 through a corresponding one of terminals 211, 221 and 231. The terminals 211, 221 and 231, respectively, correspond to the U phase, the V phase and the W phase.

A high potential-side terminal of each of the three pairs of the switching elements is electrically connected to the main power supply 11. The electric power from the main power supply 11 is converted and supplied to the windings 21, 22 and 23 according to switching operations of the six switching elements. Thus, the motor 20 is rotated.

Similarly to the inverter 31, the inverter 32 is a three-phase inverter. The inverter 32 has six switching elements that are bridge-connected to each other to switch an electric current supply to the respective windings 24 to 26 of the winding unit 28. Similarly to the inverter 31, the switching elements of the inverter 32 are, for example, MOS-FETs.

In the inverter 32, the six switching elements are paired. Namely, the inverter 32 has three pairs of switching elements. Each pair of the switching elements is made of a high potential-side switching element and a low potential-side switching element. A connecting point between the high potential-side switching element and the low potential-side switching element is electrically connected to a corresponding one of the windings 24, 25, and 26 through a corresponding one of terminals 241, 251 and 261. The terminals 241, 251 and 261, respectively, correspond to the U phase, the V phase and the W phase. A high potential-side terminal of each of the three pairs of the switching elements is electrically connected to the main power supply 11. The electric power from the main power supply 11 is converted and supplied to the windings 24, 25 and 26 according to switching operations of the six switching elements. Thus, the motor 20 is rotated.

In the present embodiment, at least one of the inverter 31 and the inverter 32 converts the electric power from the main power supply 11, and supplies the electric power converted to the motor 20 (windings 21 to 26), thereby to rotate the motor 20. In the present embodiment, as described above, the EPS-ECU 1 has two systems of power converting parts (inverters). Therefore, even if one of the two systems of the converting parts has an abnormality, the rotation of the motor 20 can be continued by the other of the two systems of the converting parts. The inverters 31 and 32 are correspondingly provided for the winding units 27 and 28. The inverters 31 and 32 convert the electric power from the main power supply 11 and supply the electric power converted to the motor 20.

The relay 41 is disposed between the main power supply 11 and the inverter 31. The relay 41 includes switching elements 411 and 412. Similarly to the switching elements of the inverters 31 and 32, the switching elements 411 and 412 are, for example, MOS-FETs. The relay 41 is a semiconductor relay. When the switching element 411 and the switching element 412 are both in on states, the relay 41 permits a flow of the electric power between the main power supply 11 and the inverter 31. When the switching element 411 and the switching element 412 are both in off states, the relay 41 shuts off the flow of the electric power between the main power supply 11 and the inverter 31.

The switching element 411 and the switching element 412 are connected in series such that the sources thereof are connected to each other, that is, the directions of parasitic diodes thereof are opposite to each other. The switching element 411 is disposed such that a cathode of the parasitic diode is adjacent to the main power supply 11. The switching element 412 is disposed such that a cathode of the parasitic diode is adjacent to the inverter 31. Thus, when the switching element 411 and the switching element 412 are in the off states, the flow of the electric power from the main power supply 11 to the inverter 31 and the flow of the electric power from the inverter 31 to the main power supply 11 are shut off.

The relay 42 is disposed between the main power supply 11 and the inverter 32. The relay 42 includes switching elements 421 and 422. Similarly to the switching elements 411, 412 of the relay 41, the switching elements 421 and 422 are, for example, MOS-FETs. The relay 42 is a semiconductor relay. When the switching element 421 and the switching element 422 are both in on states, the relay 42 permits a flow of the electric power between the main power supply 11 and the inverter 32. When the switching element 421 and the switching element 422 are both in off states, the relay 42 shuts off the flow of the electric power between the main power supply 11 and the inverter 32.

The switching element 421 and the switching element 422 are connected in series such that the sources thereof are connected to each other, that is, the directions of parasitic diodes thereof are opposite to each other. The switching element 421 is disposed such that a cathode of the parasitic diode is adjacent to the main power supply 11. The switching element 422 is disposed such that a cathode of the parasitic diode is adjacent to the inverter 32. Thus, when the switching element 421 and the switching element 422 are in the off states, the flow of the electric power from the main power supply 11 to the inverter 32 and the flow of the electric power from the inverter 32 to the main power supply 11 are shut off.

In this way, the relays 41 and 42 are disposed between the main power supply 11 and the inverters 31 and 32, and permit and shut off the flows of the electric power between the main power supply 11 and the inverters 31 and 32. When the relay 41 is in an on state, that is, when the switching elements 411 and 412 are in the on states, the electric power from the main power supply 11 is supplied to the winding unit 27 through the inverter 31. When the relay 42 is in an on state, that is, when the switching elements 421 and 422 are in the on states, the electric power from the main power supply 11 is supplied to the winding unit 28 through the inverter 32.

In the present embodiment, the EPS-ECU 1 includes capacitors 43 and 44, and resistors 45, 46, 47 and 48.

The capacitor 43 is disposed such that a first end thereof is connected to a point between the relay 41 and the inverter 31, and a second end thereof is connected to a ground. Therefore, the capacitor 43 can stabilize the electric power supplied to the inverter 31 through the relay 41.

The capacitor 44 is disposed such that a first end thereof is connected to a point between the relay 42 and the inverter 32, and a second end thereof is connected to the ground. Therefore, the capacitor 44 can stabilize the electric power supplied to the inverter 32 through the relay 42.

The resistor 45 is disposed such that a first end thereof is connected to a point between the first end of the capacitor 43 and the inverter 31. The resistor 46 is disposed such that a first end thereof is connected to a second end of the resistor 45, and a second end thereof is connected to the ground.

The resistor 47 is disposed such that a first end thereof is connected to a point between the first end of the capacitor 44 and the inverter 32. The resistor 48 is disposed such that a first end thereof is connected to a second end of the resistor 47, and a second end thereof is connected to the ground.

The EPS-ECU 1 further includes a coil 71 and a capacitor 72.

The coil 71 is disposed such that a first end thereof is connected to the main power supply 11 and a second end thereof is connected to the relay 41. The capacitor 72 is disposed such that a first end thereof is connected to a point between the main power supply 11 and the coil 71, and a second end thereof is connected to the ground. The coil 71 and the capacitor 72 form a filter circuit to reduce a noise transmitted to the motor 20 from another device that shares the battery 13 with the EPS-ECU 1 as well as to reduce a noise transmitted from the motor 20 to another device that shares the battery 13 with the EPS-ECU 1. The coil 71 can attenuate fluctuations in the electric power supplied to the motor 20 from the battery 13 through the main power supply 11.

The control part 50 includes a microcomputer (MC) 51 and an integrated IC 52.

The microcomputer 51 is a semiconductor package having a CPU, a ROM, a RAM, an I/O and the like. The microcomputer 51 performs computations according to programs stored in the ROM based on information from various sensors, such as the position sensor 29, the torque sensor 94 and the vehicle speed sensor 95, to control respective parts inside of the EPS-ECU 1.

The integrated IC 52 is a semiconductor package having a regulator (RG) 521 and a driver (DRV) 522.

The regulator 521 is electrically connected to an ignition power supply 12, which serves as a second power supply. The ignition power supply 12 is electrically connectable to the high-potential side (positive-side) terminal of the battery 13. An ignition switch 14 is provided between the battery 13 and the ignition power supply 12. When being in an on state, the ignition switch 14 permits the flow of electric power between the battery 13 and the ignition power supply 12. When being in an off state, the ignition switch 14 shuts off the flow of the electric power between the battery 13 and the ignition power supply 12.

When the ignition switch 14 is in the on state, the electric power is supplied from the ignition power supply 12 to the regulator 521. The regulator 521 stabilizes the voltage of the electric power supplied in a predetermined range, and supplies the electric power stabilized to the microcomputer 51 and the driver 522. Thus, the microcomputer 51 and the driver 522 are operated by the electric power supplied from the regulator 521.

The driver 522 applies command signals to gates of the switching elements 411, 412, 421, and 422 and the switching elements of the inverters 31 and 32 based on control signals from the microcomputer 51 to operate the respective switching elements. That is, the microcomputer 51 can control operations of the relays 41 and 42 and the inverters 31 and 32 through the driver 522.

In this way, the control part 50 is operated by the electric power from the ignition power supply 12, and controls the motor 20 by controlling the operations of the relays 41 and 42 and the inverters 31 and 32.

In the present embodiment, the microcomputer 51 is electrically connected between the resistor 45 and the resistor 46. Therefore, the microcomputer 51 can sense the voltage applied to the inverter 31. Also, the microcomputer 51 is electrically connected between the resistor 47 and the resistor 48. Therefore, the microcomputer 51 can sense the voltage applied to the inverter 32.

The EPS-ECU 1 further includes a coil 73, a capacitor 74, and a diode 75.

The coil 73 is disposed such that a first end thereof is connected to the ignition power supply 12, and a second end thereof is connected to the control part 50 (regulator 521). The capacitor 74 is disposed such that a first end thereof is connected to a point between the ignition power supply 12 and the coil 73, and a second end thereof is connected to the ground. The coil 73 and the capacitor 74 form a filter circuit to reduce a noise transmitted to the control part 50 from another device that shares the battery 13 with the EPS-ECU 1.

The coil 73 attenuates fluctuations in the electric power supplied to the control part 50 from the battery 13 through the ignition power supply 12.

The diode 75 is disposed between the coil 73 and the control part 50 (regulator 521). The diode 75 is disposed such that a cathode thereof is adjacent to the control part 50. The diode 75 rectifies the flow of the electric power between the ignition power supply 12 and the control part 50.

The boosting part 60 includes a coil 61, a switching element 62, a driver (DRV) 63, a comparator 64, resistors 65 and 66, a diode 67, a capacitor 68 and the like.

A first end 601 of the boosting part 60 is electrically connected between the relay 42 and the inverter 32. In other words, the first end 601 of the boosting part 60 is electrically connected between at least one (42) of "the relays (42), excluding one (41), among the plurality of relays (41, 42)" and the inverter (32) correspondingly provided for the at least one (42). A second end 602 of the boosting part 60 is electrically connected to the regulator 521 of the control part 50. The second end 602 of the boosting part 60 is located on a wiring electrically connecting between the ignition power supply 12 and the control part 50 (regulator 521).

The coil 61 is disposed such that a first end thereof is connected to the first end 601 of the boosting part 60.

The switching element 62 is, for example, a MOS-FET, similarly to the switching elements of the inverters 31 and 32 and the switching elements 411, 412, 421 and 422 of the relays 41 and 42. The switching element 62 is disposed such that a drain is connected to a second end of the coil 61 and a source is connected to the ground. Also, the switching element 62 is disposed such that a cathode of a parasitic diode thereof is adjacent to the coil 61.

The driver 63 is electrically connected to a gate of the switching element 62. An output terminal of the comparator 64 is electrically connected to the driver 63. The resistor 65 is disposed such that a first end thereof is connected to a point between the second end of the coil 61 and the second end 602 of the boosting part 60. The resistor 66 is disposed such that a first end thereof is connected to the second end of the resistor 65 and a second end thereof is connected to the ground.

One of input terminals of the comparator 64 is connected to a point between the resistor 65 and the resistor 66. Therefore, the comparator 64 is applied with a voltage having a value corresponding to the value of the voltage between the coil 61 and the second end 602 of the boosting part 60. The other of the input terminals of the comparator 64 is, for example, applied with a reference voltage value Vref from the microcomputer 51. The comparator 64 compares "the value of the voltage corresponding to the voltage between the coil 61 and the second end 602 of the boosting part 60" with the reference voltage value Vref. Specifically, the comparator 64 outputs a voltage value obtained by subtracting the reference voltage value Vref from "the value of the voltage corresponding to the voltage between the coil 61 and the second end of the boosting part 60" to the driver 63.

The driver 63 does not apply the command signal to the switching element 62 when the voltage value outputted from the comparator 64 is equal to or greater than zero. In such a case, since the switching element 62 is in an off state, the voltage at the first end 601 and the voltage at the second end 602 are equal to each other.

The driver 63 operates the switching element 62 such that the switching element 62 reciprocates the on state and the off state, when the voltage value outputted from the comparator 64 is a negative value. In such a case, the voltage at the first end 601 is boosted, and is outputted from the second end 602.

That is, the boosting part 60 boosts the voltage of the first end 601 and outputs the voltage boosted from the second end 602, when the voltage of the electric power supplied from the control part 50 is lower than the reference voltage value Vref. As such, the voltage of the electric power supplied to the control part 50 can be always kept to a value equal to or greater than the reference voltage value Vref. When the reference voltage value Vref is set to a value equal to or greater than the operation guarantee voltage of the control part 50, the control part 50 is restricted from being restarted or being stopped.

The diode 67 is disposed between the second end of the coil 61 and the second end 602 (control part 50). The diode 67 is disposed such that a cathode thereof is adjacent to the second end 602. The diodes 67 rectify the flow of the electric power between the first end 601 and the second end 602.

The capacitor 68 is disposed such that a first end thereof is connected to a point between the diode 67 and the second end 602, and a second end thereof is connected to the ground. Therefore, the electric power supplied to the control part 50 through the boosting part 60 can be stabilized.

Figure 3:
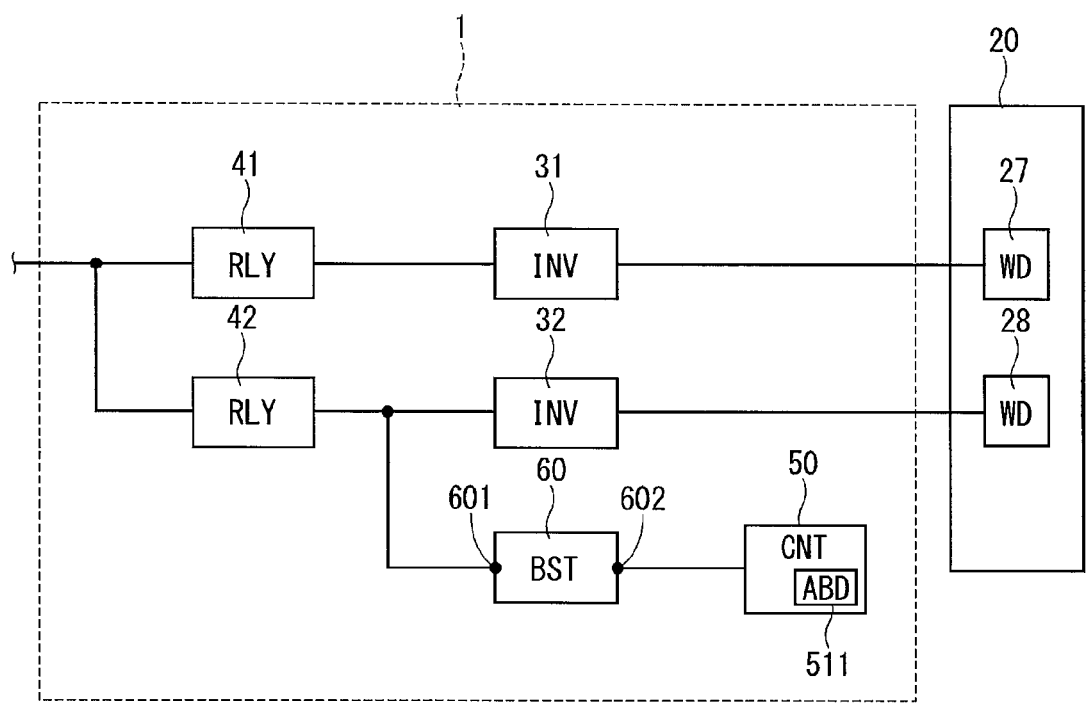
FIG. 3 is a schematic block diagram of the control unit according to the first embodiment.

As shown in FIG. 3, the first end 601 of the boosting part 60 is electrically connected between the at least one (42) of "the relays (42), excluding one relay (41), among the plurality of relays (41, 42)" and the inverter (32) corresponding to the at least one (42), and the second end 602 of the boosting part 60 is electrically connected to the control part 50. Thus, the boosting part 60 can boost the voltage of the first end 601 and output the voltage boosted from the second end 602. In the example shown in FIG. 3, the first end 601 of the boosting part 60 is electrically connected to a point between the relay 42 and the inverter 32.

For example, in a case where the switching element 62 of the boosting part 60 has an on-failure, which makes the switching element 62 always in the on state, when the relay 42 is in the on state, the electric power from the main power supply 11 continuously flows to the ground through the relay 42, the first end 601 and the switching element 62. The voltage applied to the inverter 32 in this case is lower than the voltage applied to the inverter 32 in a case where the switching element 62 does not have an on-failure.

In the present embodiment, the microcomputer 51 includes an abnormality detecting portion (ABD) 511, as a functional structure. The abnormality detecting portion 511 monitors "the voltage applied to the inverter 32" detected based on the signal outputted between the resistor 47 and the resistor 48. The abnormality detecting portion 511 determines that the switching element 62 has an abnormality, e.g., an on-failure, when the voltage monitored is equal to or lower than a predetermined value. That is, the abnormality detecting portion 511 detects an abnormality of the switching element 62 of the boosting part 60 based on "the voltage applied to the inverter 32".

When the abnormality detecting portion 511 detects the abnormality of the switching element 62, the microcomputer 51 controls the relay 42, to which the first end 601 of the boosting part 60 is connected, to turn off, thereby to shut off the electric power supply from the main power supply 11 to the boosting part 60 and the inverter 32 correspondingly provided to the relay 42.

That is, the microcomputer 51 separates the boosting part 60 from the EPS-ECU 1 and makes the boosting part 60 in an inactive state. Therefore, the electric power flowing from the main power supply 11 to the ground through the relay 42, the first end 601 and the switching element 62 is shut off. In such a case, since the relay 42 is controlled to be in the off state, the electric power supplied to the inverter 32 (winding unit 28) is shut off. However, since the relay 41 is controlled to be in the on state, the electric power supply to the inverter 31 (winding unit 27) is permitted. Therefore, the motor 20 is kept in control. That is, the rotation of the motor 20 can be kept.

The power supply line 81 is disposed such that a first end thereof is connected to a point between the switching element 411 and the switching element 412 of the relay 41, and a second end thereof is connected to the control part 50 (regulator 521). Therefore, when the relay 41 is in the on state, that is, when at least the switching element 411 is in the on state, the electric power from the main power supply 11 can be supplied to the control part 50 through the power supply line 81.

The power supply line 82 is disposed such that a first end thereof is connected to a point between the switching element 421 and the switching element 422 of the relay 42, and a second end thereof is connected to the control part 50 (regulator 521). Therefore, when the relay 42 is in the on state, that is, when at least the switching element 421 is in the on state, the electric power from the main power supply 11 can be supplied to the control part 50 through the power supply line 82.

A diode 83 is disposed on the power supply line 81 such that a cathode of the diode 83 is adjacent to the control part 50. The diode 83 rectifies the electric power flowing in the power supply line 81.

A diode 84 is disposed on the power supply line 82 such that a cathode of the diode 84 is adjacent to the control part 50. The diode 84 rectifies the electric power flowing in the power supply line 82.

As shown in FIG. 2, the vehicle has an electronic control unit (ECU) 15. The ECU 15 is a small-sized computer including a CPU, a ROM, a RAM, an I/O and the like. The ECU 15 performs computations according to programs stored in the ROM based on information provided from various sensors of the vehicle, and controls the engine and various devices of the vehicle, thereby integrally control the vehicle.

The ECU 15 functions as an operation stop portion. Although not illustrated, when an operation stop condition as a condition for stopping the engine is established, the ECU 15 stops the operation of the engine. In this case, "the operation stop condition" is assumed as "an elapse of a predetermined time from the time the vehicle speed becomes zero after the vehicle is decelerated according to a brake pedal being operated by a driver" or the like. In this condition, the operation stopping portion functions as a so-called idle reduction portion.

The ECU 15 also functions as an operation starting portion. When an operation start condition, as a condition for starting the operation of the engine, is established, the ECU 15 restarts the operation of the engine. In this case, "the engine start condition" is assumed as "the amount of operation of the brake pedal by the driver is equal to or less than a predetermined value" or the like. When the operation start condition is established, the ECU 15 drives a starter 16 (see FIG. 1) to crank the engine, thereby to start the operation of the engine.

The starter 16 is an electric motor, and is driven by the electric power from the battery 13. When the engine is started, the starter 16 is driven. Therefore, the voltage of the electric power from the battery 13 may be lowered to a level equal to or lower than a predetermined value. In the present embodiment, the EPS-ECU 1 has the boosting part 60. Therefore, even when the voltage of the electric power from the battery 13 is lowered due to the driving of the starter 16 and the voltage of the electric power supplied from the ignition power supply 12 to the control part 50 becomes lower than the reference voltage value Vref, the boosting part 60 can supply the electric power boosted equal to or higher than the reference voltage value Vref to the control part 50.

In the present embodiment, when the abnormality detecting portion 511 detects the abnormality of the switching element 62 of the boosting part 60, the EPS-ECU 1 notifies the ECU 15 of the abnormality of the boosting part 60. When the ECU 15 is notified of the abnormality of the boosting part 60, the ECU 15 prohibits "the stopping of the engine by the operation stop portion", which is performed when the operation stop condition is established. As such, when the engine is restarted from the idle reduction state, the voltage drop of the battery 13 due to the driving of the starter 16 can be reduced.

Next, examples of operations of the EPS-ECU 1 and the ECU 15 will be described.

When the driver turns on the ignition switch 14, the electric power is supplied from the battery 13 to the control part 50 through the ignition power supply 12. Thus, the control part 50 (EPS-ECU 1) is activated.

After the activation, the control part 50 performs a pre-processing, such as abnormality determination, and controls to turn on the relays 41 and 42. With this, the inverters 31 and 32 are in conditions of being supplied with the electric power from the main power supply 11 through the relays 41 and 42. Further, the control part 50 is in a condition of being supplied with the electric power from the main power supply 11 through the power supply lines 81 and 82, in addition to the electric power from the ignition power supply 12.

The control part 50 controls the inverters 31 and 32 based on the information from the position sensor 29, the torque sensor 94, the vehicle speed sensor 95 and the like, thereby to control the rotation of the motor 20. As such, the driver's steering operation can be assisted by the electric power steering apparatus 99.

The ECU 15 stops the engine when the operation stop condition is established (idle reduction). Thereafter, when the operation start condition is established, the ECU 15 drives the starter 16 to start the engine. In this time, the voltage of the electric power from the battery 13 may be lowered equal to or lower than the predetermined value.

In the present embodiment, even when the voltage of the electric power from the battery 13 is lowered due to the driving of the starter 16 and the voltage of the electric power supplied from the ignition power supply 12 to the control part 50 becomes lower than the reference voltage value Vref, the boosting part 60 can supply the electric power boosted equal to or higher than the reference voltage value Vref to the control part 50. Therefore, a situation where "the electric power steering apparatus 99 does not function due to the restarting or the stopping of the control part 50" at the time of starting the engine can be reduced.

In the present embodiment, even at a timing other than the starting of the engine, when the voltage of the electric power from the battery 13 is lowered due to some reason and the voltage of the electric power supplied from the ignition power supply 12 to the control part 50 becomes lower than the reference voltage value Vref, the boosting part 60 can supply the electric power boosted equal to or higher than the reference voltage value Vref to the control part 50. Therefore, the operation of the electric power steering apparatus 99 can be continued even if the voltage of the electric power from the battery 13 is dropped, even at the timing other than the starting of the engine.

The microcomputer 51 of the control part 50 includes the abnormality detecting portion 511. When the abnormality detecting portion 511 detects an abnormality of the switching element 62 of the boosting part 60, the microcomputer 51 controls to turn off the relay 42 to which the first end 601 of the boosting part 60 is connected, thereby to shut off the electric power supply from the main power supply 11 to the boosting part 60 and to the inverter 42, which correspondingly provided for the relay 42. That is, the microcomputer 51 separates the boosting part 60 from the EPS-ECU 1 to deactivate the boosting part 60. Accordingly, the electric power flowing from the main power supply 11 to the ground through the relay 42, the first end 601 and the switching element 62 can be shut off.

In this case, although the electric power supply to the inverter 32 (winding unit 28) can be shut off by turning off the relay 42, the relay 41 is turned on and the electric power supply to the inverter 31 (winding unit 27) is permitted. Therefore, the control (rotation) of the motor 20 can be continued. Accordingly, even if the boosting part 60 has an abnormality, the operation of the electric power steering apparatus 99 can be continued.

When the abnormality detecting portion 511 detects the abnormality of the switching element 62 of the boosting part 60, the EPS-ECU 1 notifies the ECU 15 of the abnormality of the boosting part 60. When the ECU 15 is notified of the abnormality of the boosting part 60 by the EPS-ECU 1, the ECU 15 prohibits "the stopping of the engine by the operation stop portion", which is performed when the operation stop condition is established.

Therefore, when the engine is restarted from the idle reduction state, the voltage drop of the battery 13 due to the driving of the starter 16 can be restricted. Accordingly, a situation where "the electric power steering apparatus 99 does not function due to the control part 50 being restarted or stopped because of the voltage drop of the battery 13 according to the driving of the starter 16 in the state where the boosting part 60 does not function", when the boosting part 60 has an abnormality.

When the driver turns off the ignition switch 14, although the electric power supply from the ignition power supply 12 to the control part 50 is shut off, the control part 50 is supplied with the electric power from the main power supply 11 through the power supply lines 81 and 82. The control part 50 is operated by the electric power from the main power supply 11, and performs a post-processing. Thereafter, the control part 50 turns off the relays 41 and 42 to stop the EPS-ECU 1.

(1) The EPS-ECU 1 of the present embodiment is the control unit for controlling the motor 20 that is rotated by the electric power supplied from the main power supply 11. The motor 20 has the winding units 27 and 28 made of the windings 21 to 23 and 24 to 26 correspondingly provided for the plural phases, such as the U phase, the V phase and the W phase. The EPS-ECU 1 includes the inverters 31 and 32, the relays 41 and 42, the control part 50, the boosting part 60 and the abnormality detecting portion 511.

The inverters 31 and 32 are correspondingly provided for the winding units 27 and 28. The inverters 31 and 32 convert the electric power from the main power supply 11, and supply the electric power converted to the motor 20. That is, the two inverters 31 and 32 are provided. In other words, the two systems of the inverters (31, 32) are provided. The relay 41 is disposed between the main power supply 11 and the inverter 31. The relay 41 permits and shuts off the flow of the electric power between the main power supply 11 and the inverter 31. The relay 42 is disposed between the main power supply 11 and the inverter 32. The relay 42 permits and shuts off the flow of the electric power between the main power supply 11 and the inverter 31. That is, the plurality of the relays (41, 42) is provided. The control part 50 is operated by the electric power from the ignition power supply 12. The control part 50 controls the operations of the relays 41 and 42 and the inverters 31 and 32, thereby to control the motor 20.

The first end 601 of the boosting part 60 is electrically connected between at least one (42) of "the relays (42), excluding one (41) selected from the plurality of relays (41, 42)" and the inverter (32) corresponding to the at least one (42). The second end 602 of the boosting part 60 is electrically connected to the control part 50. The boosting part 60 boosts the voltage of the first end 601 and outputs the voltage boosted from the second end 602.

Therefore, even if the voltage of the ignition power supply 12 that supplies the electric power to the control part 50 is lowered, the voltage of the main power supply 11 can be boosted to the voltage equal to or greater than the operation guarantee voltage by the boosting part 60, and can be provided to the control part 50. As such, the restarting or the operation stop of the control part 50 due to the voltage drop of the ignition power supply 12 can be restricted, and the control part 50 can continue the control of the motor 20. The abnormality detecting portion 511 detects an abnormality of the boosting part 60.

In the present embodiment, when the abnormality detecting portion 511 detects the abnormality of the boosting part 60, the control part 50 controls the relay 42, to which the first end 601 of the boosting part 60 is connected, to shut off the electric power supply from the main power supply 11 to the boosting part 60 and to the inverter 32, which is correspondingly provided for the relay 42. Since the electric power supply to the boosting part 60 is shut off, the boosting part 60, which has the abnormality, can be separated from the EPS-ECU 1.

In the present embodiment, as described above, it is not necessary to add a power shutting device, such as another relay, for shutting off the electric power supply to the boosting part 60, which has the abnormality. Therefore, the inverters 31 and 32, the relays 41 and 42, the control part 50, and the boosting part 60 can be housed in one housing. Accordingly, the EPS-ECU 1 including the boosting part 60 can be made with a simple structure, and reduced in size.

The electric power supply to the inverter 32, which corresponds to the relay 42 to which the first end 601 of the boosting part 60 is connected, is shut off in accordance with the shutting off of the electric power supply to the boosting part 60. However, the electric power supply to the inverter 31, which corresponds at least to "the one (41) selected from the plurality of the relays (41, 42)", can be continued. Therefore, the control and drive of the motor 20 can be continued while separating the boosting part 60 having the abnormality from the EPS-ECU 1.

(2) The EPS-ECU 1 further includes the power supply lines 81 and 82 that electrically connect between the relays 41 and 42 and the control part 50 to supply the electric power from the main power supply 11 to the control part 50. Therefore, the control part 50 can perform the post-processing by the electric power supplied from the main power supply 11 through the power supply lines 81 and 92, after the electric power supply from the ignition power supply 12 is shut off.

(3) The boosting part 60 includes the switching element 62. The abnormality detecting portion 511 detects an abnormality of the switching element 62. The abnormality detecting portion 511 detects an abnormality, such as an on-failure occurred in the switching element 62. Therefore, when the abnormality detecting portion 511 detects an abnormality of the switching element 62, the boosting part 60 including the switching element 62 is separated from the EPS-ECU 1 to restrict the electric power from flowing to the ground through the switching element 62.

(4) The electric power steering apparatus 99 includes the EPS-ECU 1 described above and the motor 20 controlled by the EPS-ECU 1. Even when the voltage of the ignition power supply 12 is lowered, the boosting part 60 can boost the voltage and output the voltage boosted to the control part 50. Therefore, the control of the motor 20 by the control part 50 can be continued. Further, even when an abnormality occurs in the boosting part 60, the control of the motor 20 can be continued while separating the boosting part 60 from the EPS-ECU 1.

Accordingly, even if the voltage of the ignition power supply 12 is lowered, or an abnormality occurs in the boosting part 60, the driver's steering operation can be assisted by the electric power steering apparatus 99, without stopping the electric power steering apparatus 99. The EPS-ECU 1 of the present embodiment is reduced in size. Therefore, the EPS-ECU 1 can be easily installed in a space where the electric power steering apparatus 99 is mounted, in the vehicle. As compared with a case where the boosting part 60 and the control part 50 are separately arranged in different housings, the manufacturing costs can be reduced.

Second Embodiment

Figure 4:
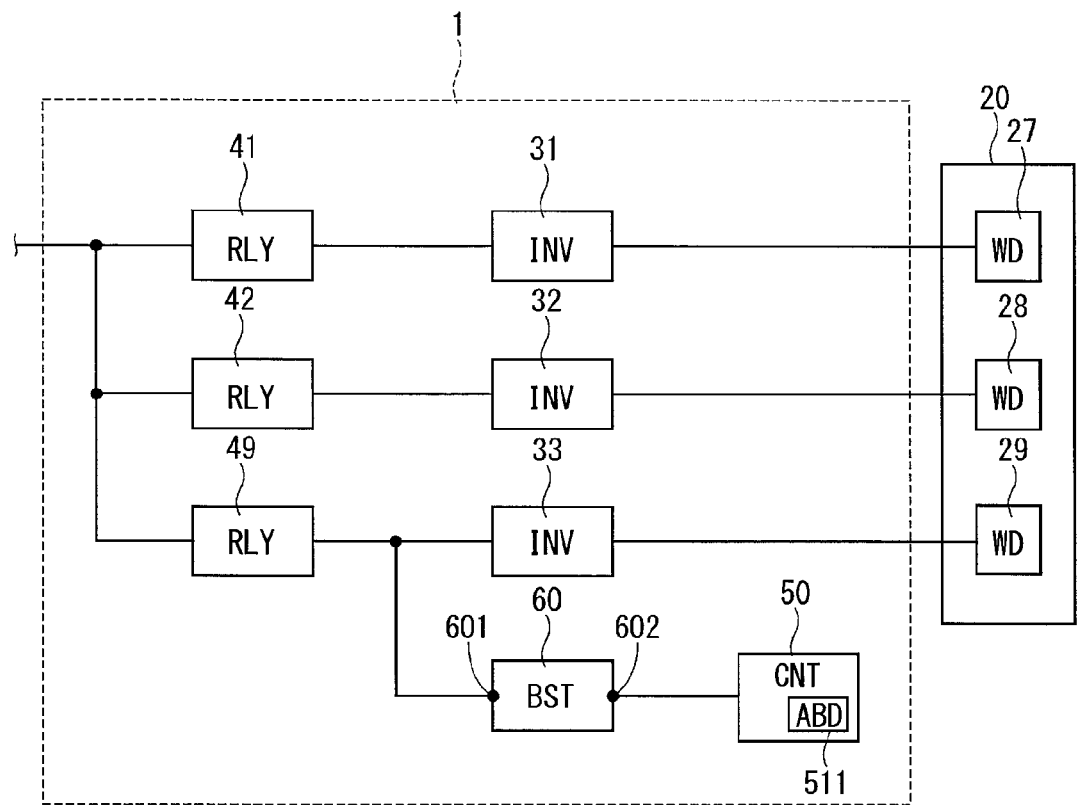
FIG. 4 is a schematic block diagram of a control unit according to a second embodiment of the present disclosure.

A part of a control device according to a second embodiment of the present disclosure is shown in FIG. 4. In the second embodiment, the structure of the motor 20, which is an object to control, an internal structure of the EPS-ECU 1 and the like are different from those of the first embodiment.

In the second embodiment, the motor 20, which is an object to control by the EPS-ECU 1, includes a winding unit 29, in addition to the winding units 27 and 28. The winding unit 29 is made of three windings (not shown), which respectively correspond to the U phase, the V phase and the W phase.

The EPS-ECU 1 includes an inverter 33, in addition to the inverters 31 and 32. The inverter 33 has a similar structure to that of the inverters 31 and 32. The inverter 33 is electrically connected to the winding unit 29.

In the present embodiment, at least one of the inverters 31, 32 and 33 converts the electric power from the main power supply 11 and supplies the electric power converted to the motor 20, thereby to rotate the motor 20.

In the present embodiment, the EPS-ECU 1 is provided with three inverters. That is, the EPS-ECU 1 is provided with three systems of the power converting parts (inverters). Therefore, even if an abnormality occurs in one system, the rotation of the motor 20 can be continued by the other systems.

The inverters 31, 32 and 33 are correspondingly provided for the winding units 27, 28 and 29. The inverters 31, 32 and 33 convert the electric power from the main power supply 11 and supply the electric power converted to the motor 20.

The EPS-ECU 1 further includes a relay 49, in addition to the relays 41 and 42. The relay 49 has a structure similar to that of the relays 41 and 42. The relay 49 is disposed between the main power supply 11 and the inverter 33. When being in an on state, the relay 49 permits the flow of the electric power between the main power supply 11 and the inverter 33. When being in an off state, the relay 49 shuts off the flow of the electric power between the main power supply 11 and the inverter 33.

In the present embodiment, the first end 601 of the boosting part 60 is electrically connected to a point between the relay 49 and the inverter 33. That is, the first end 601 of the boosting part 60 is connected between the at least one (43) of "the other relays (42, 43), excluding one (41) selected from the plurality of relays (41, 42, 43)" and the inverter 33. The second end 602 of the boosting part 60 is electrically connected to the control part 50.

In the present embodiment, when the abnormality detecting portion 511 detects an abnormality of the switching element 62 of the boosting part 60, the control part 50 controls to turn off the relay 49 to which the first end 601 of the boosting part 60 is connected. Therefore, the electric power supply from the main power supply 11 to the boosting part 60 and to the inverter 33, which is correspondingly provided for the relay 49, can be shut off. That is, the boosting part 60 is separated from the EPS-ECU 1 and is made in a deactivate state.

As such, it is possible to shut off the electric power flowing from the main power supply 11 to the ground through the relay 49, the first end 601 and the switching element 62. In this case, the electric power supply to the inverter 33 (winding unit 29) is shut off by turning off the relay 49. However, since the relays 41 and 42 are controlled to turn on, the electric power supply to the inverters 31 and 32 (winging units 27 and 28) is permitted. Therefore, the control (rotation) of the motor 20 can be continued.

Third Embodiment

Figure 5:
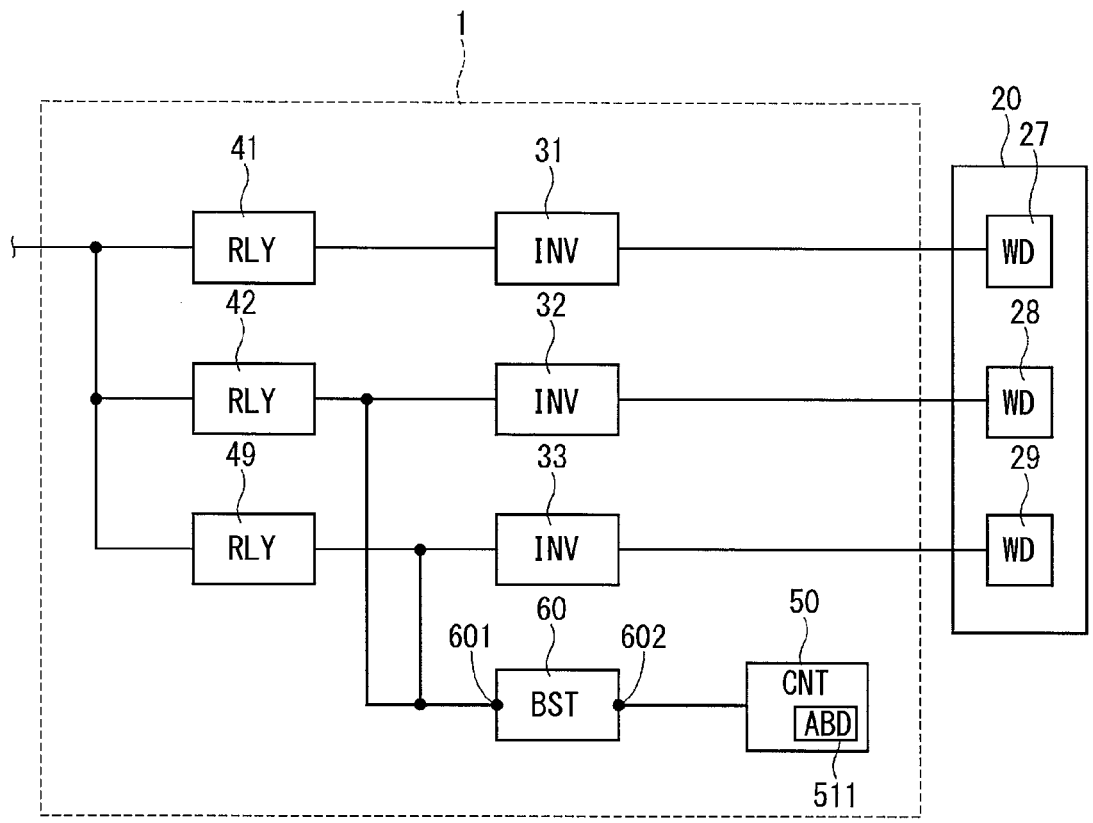
FIG. 5 is a schematic block diagram of a control unit according to a third embodiment of the present disclosure.

A part of a control unit according to a third embodiment of the present disclosure is shown in FIG. 5. In the third embodiment, an internal structure of the EPS-ECU 1, such as a connecting point of the boosting part 60, is different from that of the second embodiment.

In the third embodiment, the first end 601 of the boosting part 60 is electrically connected between the relay 42 and the inverter 43 and between the relay 43 and the inverter 33. That is, the first end 601 of the boosting part 60 is electrically connected between at least one (42, 49) of "the relays (42, 49), excluding one (41) selected from the plurality of relays (41, 42, 49)" and the inverter (32 and 33).

In the present embodiment, when the abnormality detecting portion 511 detects an abnormality of the switching element 62 of the boosting part 60, the control part 50 controls to turn off the relays 42 and 49 to which the first end of the boosting part 601 is connected. Therefore, the electric power supply from the main power supply 11 to the boosting part 60 and the inverters 32 and 33 correspondingly provided for the relays 42 and 49 is shut off. That is, the boosting part 60 is separated from the EPS-ECU 1, and is made in a deactivated state.

As such, the electric power flowing from the main power supply 11 to the ground through the relays 42 and 49, the first end 601 and the switching element 62 can be shut off. In this case, since the relays 42 and 49 are controlled to turn off, the electric power supply to the inverters 32 and 33 (winding units 28 and 29) is shut off. However, since the relay 41 is controlled to turn on, the electric power supply to the inverter 31 (winding unit 27) is permitted. Therefore, the control (rotation) of the motor 20 can be continued.

Fourth Embodiment

Figure 6:
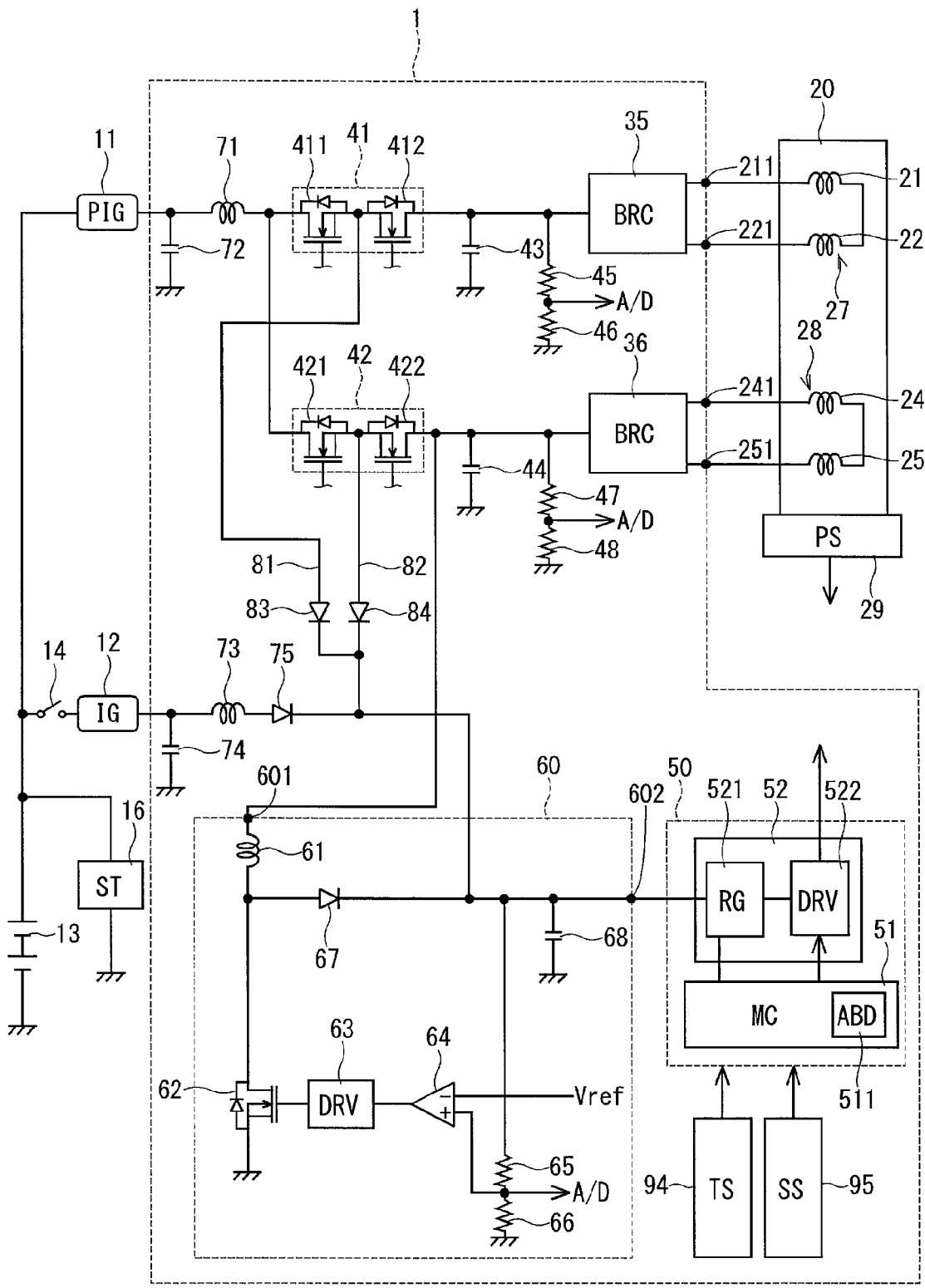
FIG. 6 is a block diagram of a control unit according to a fourth embodiment of the present disclosure.

A part of a control unit according to a fourth embodiment of the present disclosure is shown in FIG. 6.

In the fourth embodiment, a structure of the motor 20, which is an object to control, an internal structure of the EPS-ECU 1, and the like are different from those of the first embodiment.

The motor 20, which is an object to control by the EPS-ECU 1 of the fourth embodiment, is a brush motor and has the winding units 27 and 28. The winding unit 27 includes a winding 21 and a winding 22. The winding unit 28 includes a winding 24 and a winding 25.

In the present embodiment, the EPS-ECU 1 has H-bridge circuits (BRC) 35 and 36, in place of the inverters 31 and 32 of the first embodiment.

The H-bridge circuit 35 includes four switching elements that are bridge-connected to each other so as to switch an electric current to each of the windings 21 and 22 of the winding unit 27. The switching elements of the H-bridge circuit 35 are, for example, MOS-FETs.

The four switching elements of the H-bridge circuit 35 are paired to provide two pairs of switching elements. Each of the two pairs of the switching elements includes a high potential-side switching element and a low potential-side switching element. In one of the two pairs of the switching elements, a point between the high potential-side switching element and the low potential-side switching element is electrically connected to the winding 21 through a terminal 211. In the other of the two pairs of the switching elements, a point between the high potential-side switching element and the low potential-side switching element is electrically connected to the winding 22 through a terminal 221. The terminals 211 and 221 are correspondingly provided for the windings 21 and 22.

In each of the two pairs of the switching elements, a high potential-side terminal is electrically connectable to the main power supply 11. When the four switching elements of the H-bridge circuit 35 are operated, the electric power from the main power supply 11 is converted, and supplied to the windings 21 and 22. Thus, the motor 20 rotates.

The H-bridge circuit 36 includes four switching elements bridge-connected to each other so as to switch an electric current to each of the windings 24 and 25 of the winding unit 28. The switching elements of the H-bridge circuit 36 are, for example, MOS-FETs, similarly to the H-bridge circuit 35.

The four switching elements of the H-bridge circuit 36 are paired to provide two pairs of switching elements. Each of the two pairs of the switching elements includes a high potential-side switching element and a low potential-side switching element. In one of the two pairs of the switching elements, a point between the high potential-side switching element and the low potential-side switching element is electrically connected to the winding 24 through a terminal 241. In the other of the two pairs of the switching elements, a point between the high potential-side switching element and the low potential-side switching element is electrically connected to the winding 25 through a terminal 251. The terminals 241 and 251 are correspondingly provided for the windings 24 and 25.

In each of the two pairs of the switching elements, a high potential-side terminal is electrically connectable to the main power supply 11. When the four switching elements of the H-bridge circuit 36 are operated, the electric power from the main power supply 11 is converted, and supplied to the windings 24 and 25. Thus, the motor 20 rotates.

In the present embodiment, at least one of the H-bridge circuit 35 and the H-bridge circuit 36 converts the electric power from the main power supply 11, and supplies the electric power converted to the motor 20 (windings 21, 22, 24 and 25), thereby to rotate the motor 20. In this way, the EPS-ECU 1 includes two systems of the converting parts (H-bridge circuits). Even if an abnormality occurs in one of the two systems, the rotation of the motor 20 can be continued by the other of the two systems.

The H-bridge circuits 35 and 36 are correspondingly provided for the winding units 27 and 28. The H-bridge circuits 35 and 36 convert the electric power from the main power supply 11 and supply the electric power converted to the motor 20.

In the present embodiment, the internal structure of the EPS-ECU 1 is similar to that of the EPS-ECU 1 of the first embodiment, except for the H-bridge circuits 35 and 36 instead of the inverters 31 and 32.

The EPS-ECU 1 of the present embodiment is the control unit for controlling the motor 20 that is rotated by the electric power supplied from the main power supply 11. The motor 20 has the winding units 27 and 28 made of the windings 21, 22, 24 and 25 correspondingly provided for the plural terminal 211, 221, 241 and 251. The EPS-ECU 1 includes the H-bridge circuits 35 and 36, the relays 41 and 42, the control part 50, the boosting part 60 and the abnormality detecting portion 511.

The H-bridge circuits 35 and 36 are correspondingly provided for the winding units 27 and 28. The H-bridge circuits 35 and 36 convert the electric power from the main power supply 11, and supply the electric power converted to the motor 20. That is, the two H-bridge circuits 35, 36 are provided. In other words, the two systems of the H-bridge circuits (35, 36) are provided.

The relay 41 is disposed between the main power supply 11 and the H-bridge circuit 35. The relay 41 permits and shuts off the flow of the electric power between the main power supply 11 and the H-bridge circuit 35. The relay 42 is disposed between the main power supply 11 and the H-bridge circuit 36. The relay 42 permits and shuts off the flow of the electric power between the main power supply 11 and the H-bridge circuit 36. That is, a plurality of the relays (41, 42) is provided. The control part 50 is operated by the electric power from the ignition power supply 12. The control part 50 controls the operations of the relays 41 and 42 and the H-bridge circuits 35 and 36, thereby to control the motor 20.

The first end 601 of the boosting part 60 is electrically connected between at least one (42) of "the relays (42), excluding one (41) selected from the plurality of relays (41, 42)", and the H-bridge circuit 36. The second end 602 of the boosting part 60 is electrically connected to the control part 50. The boosting part 60 boosts the voltage of the first end 601 and outputs the voltage boosted from the second end 602.

Therefore, even if the voltage of the ignition power supply 12 that supplies the electric power to the control part 50 is lowered, the voltage of the main power supply 11 can be boosted to the voltage equal to or greater than the operation guarantee voltage by the boosting part 60, and can be provided to the control part 50.

As such, the restarting or the operation stop of the control part 50 due to the voltage drop of the ignition power supply 12 can be restricted, and the control part 50 can continue the control of the motor 20.

The abnormality detecting portion 511 detects an abnormality of the boosting part 60. When the abnormality detecting portion 511 detects the abnormality of the boosting part 60, the control part 50 controls the relay 42, to which the first end of the boosting part 60 is connected, to shut off the electric power supply from the main power supply 11 to the boosting part 60 and to the H-bridge circuit 36, which is correspondingly provided for the relay 42. Since the electric power supply to the boosting part 60 is shut off, the boosting part 60, which has the abnormality, can be separated from the EPS-ECU 1.

In the present embodiment, as described above, it is not necessary to add a power shutting device, such as another relay, for shutting off the electric power supply to the boosting part 60, which has the abnormality. Therefore, the H-bridge circuits 35 and 36, the relays 41 and 42, the control part 50, and the boosting part 60 can be housed in one housing. Accordingly, the EPS-ECU 1 including the boosting part 60 can be made with a simple structure, and reduced in size.

The electric power supply to the H-bridge circuit 36, which corresponds to the relay 42 to which the first end 601 of the boosting part 60 is connected, is shut off in accordance with the shutting off of the electric power supply to the boosting part 60. However, the electric power supply to the H-bridge circuit 35, which at least corresponds to "the one (41) selected from the plurality of the relays (41, 42)", can be continued. Therefore, the control and drive of the motor 20 can be continued while separating the boosting part 60 having the abnormality.

Other Embodiments

The number of the systems of the power converting parts is not limited to two or three. The power converting parts may be provided in four systems or more. The number of the relays is not limited to two or three. Four or more relays may be employed.

The boosting part 60 may be connected in any way as long as the first end 601 is electrically connected between at least one of "the relays, excluding one among the plurality of relays", and the power converting part.

In the embodiments described hereinabove, the power supply lines 81 and 82 are electrically connected to the point between the switching element 411 and the switching element 412 of the relay 41 and to the point between the switching element 421 and the switching element 422 of the relay 42. As another example, the power supply lines 81 and 82 may be electrically connected to a position adjacent to the inverter 31 on the relay 41, and to a position adjacent to the inverter 32 on the relay 42. As further another example, the EPS-ECU 1 may not have the power supply lines 81 and 82.

In the embodiments described hereinabove, the boosting part 60 includes the coil 61 and the switching element 62. The boosting part 60 boosts the voltage of the first end 601 by switching operation of the switching element 62, and outputs the voltage boosted from the second end 602. As another example, the boosting part 60 may boost the voltage of the first end 601 by a different method, and output the voltage boosted from the second end 602.

The relays are not limited to the semiconductor relays including the switching elements, but may be mechanical switching device or mechanical relays.

In the embodiments described hereinabove, the microcomputer 51 includes the abnormality detecting portion 511. As another example, the abnormality detecting portion may be included in a semiconductor package different from the microcomputer 51.

The switching elements of the power converting parts, the relays, and the boosting parts are not limited to the MOSFETs, but may be any other switching elements, such as IGBTs or transistors.

As another example, the EPS-ECU 1 may not have the capacitors 43, 44, 72, and 74, the coils 71 and 73, and the diodes 75, 83 and 84.

As another example, when the ECU 15 is notified of the abnormality of the boosting part from the control unit (EPS-ECU 1), the ECU 15 may store diagnose information in regard to the abnormality, and may notify the driver of the abnormality.

In the embodiments described hereinabove, the motor 20 is exemplarily the rotary electric machine having the three phases of the windings (U phase, V phase and W phase).

However, the number of the phases of the windings is not limited to three phases, but may be any number of phases.

In the embodiment described hereinabove, the rotary electric machine is exemplarily employed to the column assist type electric power steering apparatus. As another example, the rotary electric machine may be employed to a rack assist type electric power steering apparatus that applies an assisting torque to a rack shaft.

As another example, the rotary electric machine and the control unit may be integrated to form a mechanically and electrically integrated rotary electric machine.

Use of the rotary electric machine is not limited to the driving part of the electric power steering apparatus. The rotary electric machine may be employed as a driving part for driving a driving shaft of a hybrid vehicle, or a driving device for driving any device for other than vehicles.

While only the selected exemplary embodiment and examples have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiment and examples according to the present disclosure is provided for illustration only, and not for the purpose of limiting the disclosure as defined by the appended claims and their equivalents.

What is claimed is:

1. A control unit for a rotary electric machine that includes a plurality of winding units, each winding unit having a plurality of wirings correspondingly provided for a plurality of phases or terminals, the rotary electric machine being rotated by an electric power supplied from a first power supply, the control unit comprising:

a plurality of power converting parts correspondingly provided for the plurality of winding units, each of the power converting parts converting the electric power supplied from the first power supply;

a plurality of relays correspondingly provided for the plurality of power converting parts, each of the relays being disposed between the first power supply and a corresponding one of the power converting parts, and permitting or shutting off a flow of the electric power between the first power supply and the corresponding one of the power converting parts;

a control part being operated by an electric power supplied from a second power supply, and controlling operations of the relays and the power converting parts to control the rotary electric machine;

a boosting part having a first end and a second end, the first end being electrically connected between at least one of relays, excluding one relay among the plurality of relays, and the power converting part corresponding to the at least one of the relays, the second end being electrically connected to the control part, the boosting part boosting a voltage at the first end and outputting the voltage boosted from the second end; and an abnormality detecting portion detecting an abnormality of the boosting part, wherein when the abnormality detecting portion detects the abnormality of the boosting part, the control part controls the at least one of the relays, to which the first end of the boosting part is connected, to shut off a flow of the electric power from the first power supply to the boosting part and the power converting part corresponding to the at least one of the relays.

2. The control unit according to claim 1, further comprising:

a power supply line electrically connecting between the control part and the at least one of the relays or between the control part and a terminal of the at least one of the relays adjacent to the power converting part to supply the electric power from the first power supply to the control part.

3. The control unit according to claim 1, wherein
the boosting part includes a switching element, and
the abnormality detecting portion detects an abnormality of the switching element.

4. A power steering apparatus comprising:
the control unit according to claim 1; and
a rotary electric machine being controlled by the control unit to assist a steering operation by an operator.

* * * * *